United States Patent
Kunchipudi et al.

(10) Patent No.: US 8,645,512 B2
(45) Date of Patent: *Feb. 4, 2014

(54) SYSTEM AND METHOD OF ENABLING ACCESS TO REMOTE INFORMATION HANDLING SYSTEMS

(75) Inventors: Sridhar Kunchipudi, Bangalore (IN); Deepak Panambur, Karnataka (IN)

(73) Assignee: Dell Products, LP, Round Rock, TX (US)

( * ) Notice: Subject to any disclaimer, the term of this patent is extended or adjusted under 35 U.S.C. 154(b) by 46 days.

This patent is subject to a terminal disclaimer.

(21) Appl. No.: 13/336,364

(22) Filed: Dec. 23, 2011

(65) Prior Publication Data

US 2012/0102555 A1 Apr. 26, 2012

Related U.S. Application Data

(63) Continuation of application No. 11/828,469, filed on Jul. 26, 2007, now Pat. No. 8,108,498.

(51) Int. Cl.
*G06F 15/177* (2006.01)
*G06F 15/16* (2006.01)

(52) U.S. Cl.
USPC .......................................... 709/222; 709/217

(58) Field of Classification Search
USPC ................................................. 709/217–222
See application file for complete search history.

(56) References Cited

U.S. PATENT DOCUMENTS

| | | | |
|---|---|---|---|
| 5,276,863 A * | 1/1994 | Heider | 709/222 |
| 5,287,461 A * | 2/1994 | Moore | 709/219 |
| 6,567,919 B1 | 5/2003 | Yanagihara et al. | |
| 8,108,498 B2 * | 1/2012 | Kunchipudi et al. | 709/222 |
| 2004/0219955 A1 * | 11/2004 | daCosta | 455/574 |
| 2005/0005009 A1 * | 1/2005 | Takahashi et al. | 709/224 |
| 2005/0050318 A1 | 3/2005 | Alone et al. | |
| 2007/0067627 A1 | 3/2007 | Dokuni | |
| 2007/0073832 A1 * | 3/2007 | Curtis et al. | 709/217 |
| 2007/0143441 A1 * | 6/2007 | Yabe | 709/217 |
| 2007/0150682 A1 * | 6/2007 | Ogasawara et al. | 711/163 |
| 2008/0120504 A1 * | 5/2008 | Kirkup et al. | 713/176 |

OTHER PUBLICATIONS

Wikipedia: MAC Address, searched May 21, 2010.

* cited by examiner

*Primary Examiner* — Jeong S Park
(74) *Attorney, Agent, or Firm* — Larson Newman, LLP (57) ABSTRACT

A system and method of enabling access to remote information handling systems is disclosed. In one form, a method of enabling an initialization of an information handling system is disclosed. The method can include receiving a request to initialize a remote information handling system, and determining an access information operable to enable an initialization sequence of the remote information handling system. The access information can be configured to enable an initialization of the remote information handling system. The method can also include communicating the access information via a network to the remote information system.

20 Claims, 4 Drawing Sheets

SYSTEM AND METHOD OF ENABLING ACCESS TO REMOTE INFORMATION HANDLING SYSTEMS

CROSS REFERENCE TO RELATED APPLICATIONS

This application is a continuation of U.S. patent application Ser. No. 11/828,469 entitled "System and Method of Enabling Access to Remote Information Handling Systems," filed on Jul. 26, 2007, the disclosure of which is hereby expressly incorporated by reference in its entirety.

FIELD OF THE DISCLOSURE

This disclosure relates generally to information handling systems, and more particularly to a system and method of enabling access to remote information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a diskless computer system, a thin client, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of enabling an initialization of an information handling system is disclosed. The method can include receiving a request to initialize a remote information handling system, and determining an access information operable to enable an initialization sequence of the remote information handling system. The access information can be configured to enable an initialization of the remote information handling system. The method can also include communicating the access information via a network to the remote information system According to another aspect of the disclosure, an information handling system is disclosed. The information handling system can include a communication module operable to receive a communication from a management access terminal operable to communicate an access information configured to enable use of an initialization sequence. The information handling system can also include a processor operable to employ an initialization process operable to validate use of the initialization sequence using the access information. The information handling system can further include a memory operably coupled to the processor and accessible by the initialization process, According to one aspect, the memory can be further operable to store the access information received by the communication module.

According to a further aspect of the disclosure, a method of enabling initialization of an information handling system is disclosed. The method can include receiving a communication including an access information operable to enable an initialization sequence and storing the access information within a memory accessible in association with using the initialization sequence. The method can also include receiving a request to initiate the initialization sequence, and determining a location storing the access information. The method can further include validating the access information, and enabling the initialization sequence in response to the validation.

Figure 1:
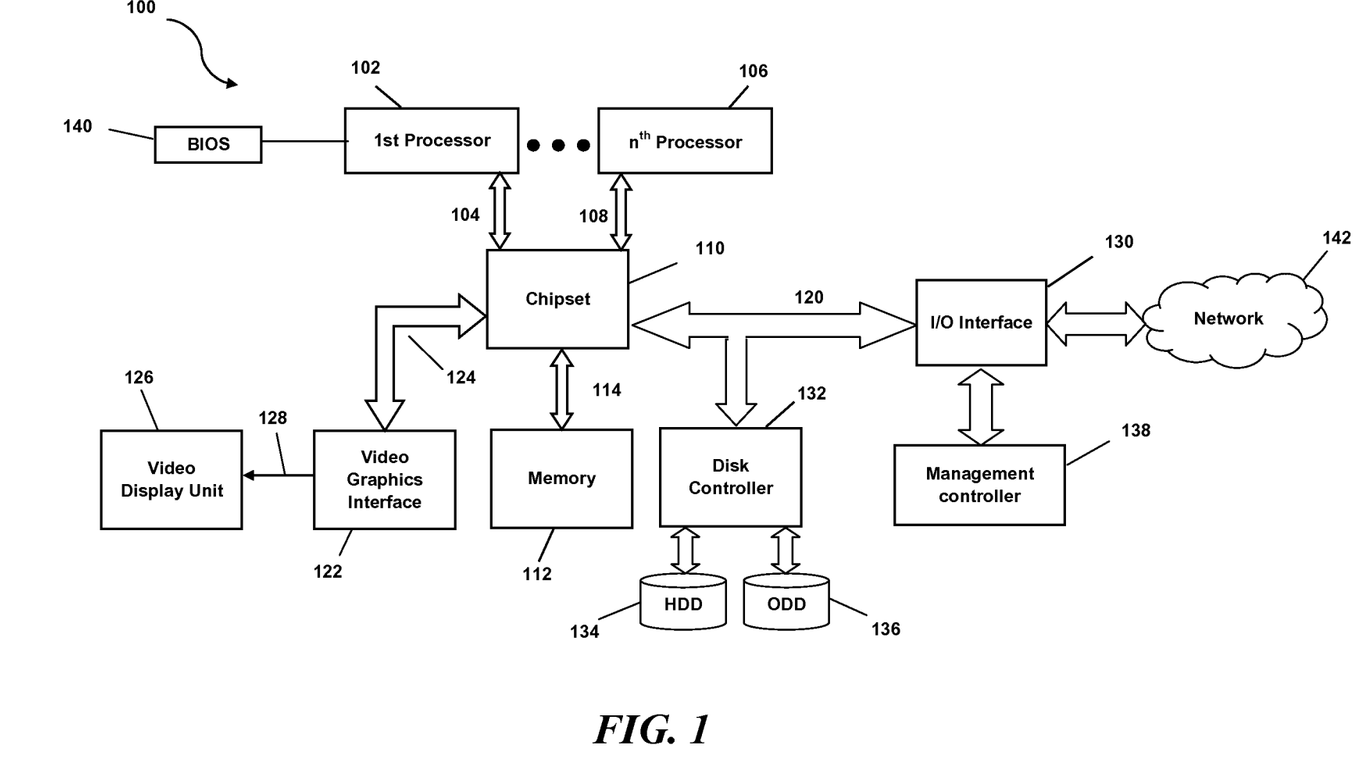
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In one form, the information handling system 100 can include a management controller 138 coupled to the I/O interface 130. The management controller 138 can access one or more I/O communication devices such as a network interface card, an Ethernet port, a LAN on Motherboard (LOM) interface, or any combination of communication devices operable to communicate information via the I/O interface 142 and a network 142 such an as the Internet or an Intranet. In one form, the I/O interface 142 can be operable to communicate data within an "in-band" communication such as public or semi-private connection. In other forms, the management controller 138 can be coupled to the I/O interface 130 operable to communicate using a private connection or "out-of-band" network communication.

In one embodiment, the management controller 138 can include, or be used in association with, a baseboard management controller (BMC), a trusted platform module (TPM), integrated management controller (IMC), or any combination thereof, operable to enable an initialization of the information handling system 100. For example, the management controller 138 can employ a BMC that can include a specialized service processor that can monitor operating states of the information handling system 100, and can communicate information via the network 142. In one form, the network 142 can be an independent network connection that can be used to facilitate out-of-band network communications between a management terminal and the information handling system 100. The BMC can be a part of the Intelligent Platform Management Interface (IPMI) and can be located within a motherboard or system board. The BMC can be used to authenticate an initialization request of the information handling system 100 using access information communicated via the network 142 from a terminal such as an administrative or system management terminal.

In another form, the management controller 138 can include or be used in association with a TPM that can include a specialized integrated circuit. The TPM can be installed on a main system board or motherboard of the information handling system 100. Other locations can also be employed. In one form, the TPM can be used to authenticate a use of the information handling system 100 and can store information specific to the information handling system 100. For example, the TPM can store access information that can include, for example, one or more encryption keys, access keys, digital certificates, system passwords, or any combination thereof. The TPM can be used to minimize risk that data on the information handling system 100 will be compromised by physical theft, or an attack by an external hacker.

In a further embodiment, the management controller 138 can also include one or more volatile memory devices or modules operable to store access information that can be accessed by the BIOS 140, the management controller 138, or various other controllers, modules, or processes that can employ access information to validate use of an initialization sequence. In one form, the management controller 138 can be configured to include a separate communication module (not illustrated) operable to receive an "out-of-band" communication via the network 142.

During operation, the information handling system 100 can be remotely accessed via the network 142 and a remote terminal that can communicate access information to the information handling system 100. For example, the access information can include, one or more encryption keys, access keys, digital certificates, passwords, system passwords, or any combination thereof. The access information can be communicated via in-band network traffic, out-of-band network traffic, or any combination thereof.

Upon a request to initialize the information handling system 100, the access information stored within a memory can be accessed to validate the request prior to initializing the information handling system 100. In one form, the BIOS 142, the management controller 144, or other type of module or process, or any combination thereof, can be used to access the access information to validate the access information communicated via the network 142 in association with initializing the information handling system 100. As such, a system administrator can request a reboot or initialization of the information handling system 100 from a terminal connect t other network 142, and the access information can be communicated to the information handling system 100 and employed to authenticate access and a valid initialization or system reboot can be deployed. In this manner, a system administrator need not couple an external key or other form of digital media directly to the information handling system 100, or input a password directly into the information handling system 100 using a keyboard or other form if user input device, to reboot or initialize the information handling system 100.

Figure 2:
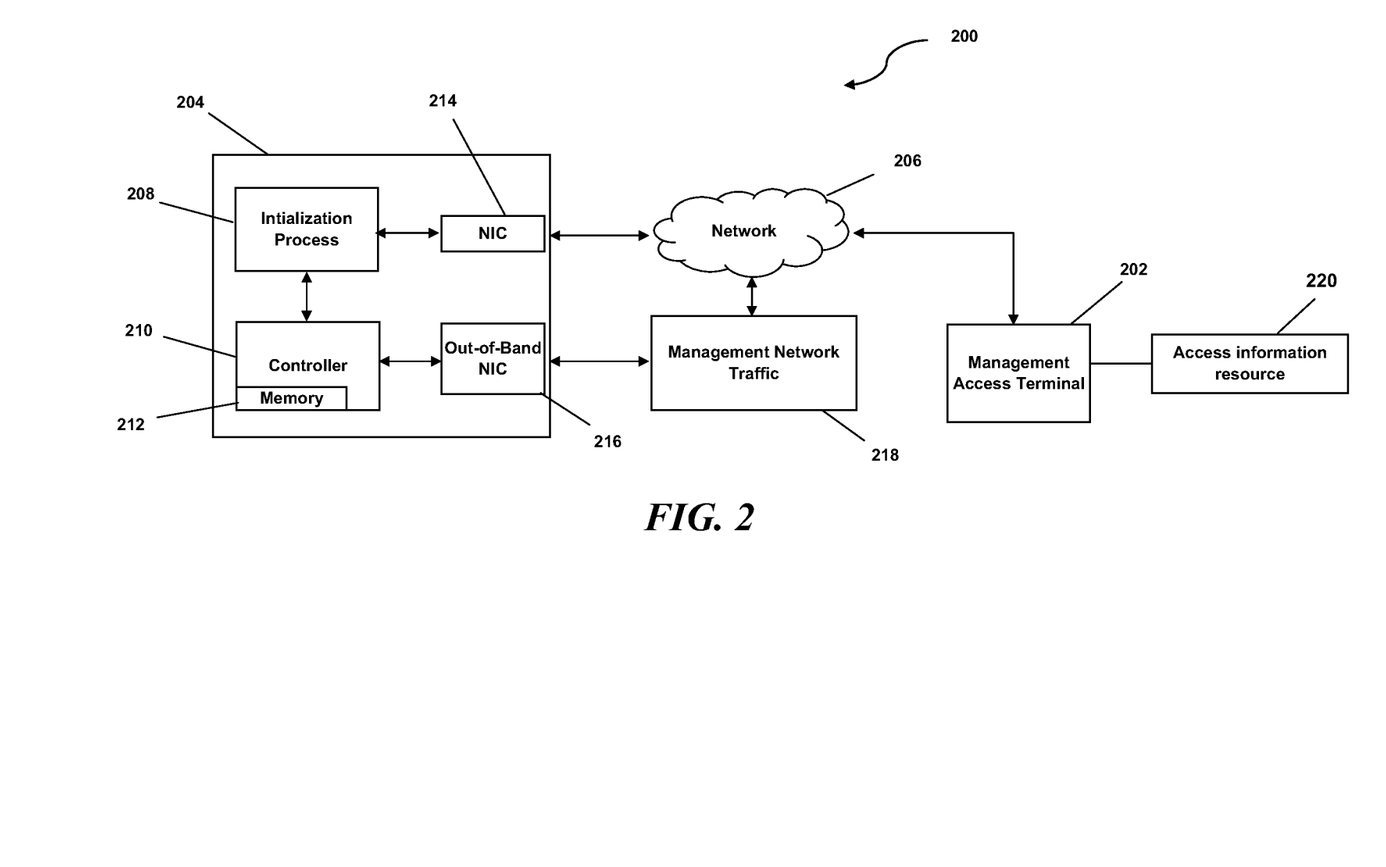
FIG. 2 illustrates a block diagram of an access system operable to enable an initialization sequence a remote information handling system according to one aspect of the disclosure.

FIG. 2 illustrates a block diagram of an access system operable to enable an initialization sequence a remote information handling system according to one aspect of the disclosure. The access system, illustrated generally at 200, can include a management access terminal 202 operable to be coupled to a remote information handling system 204 to reboot or reinitialize the remote information handling system 204. The remote information handling system 204 can include the information handling system 100 illustrated in FIG. 1 or various other information handling systems operable to be coupled to the management access terminal 202.

In one form, the remote information handling system 204 can also be configured to include various other components or devices including, but not limited to, an initialization process 208 that can be employed by a processor such as first processor 102 illustrated in FIG. 1. In one form, the information handling system 204 can also include a controller 210 such as the management controller 138 illustrated in FIG. 1. The controller 210 can include a memory 212 operable to store access information that can be used by the initialization process 208 during an initialization sequence or reboot of the remote information handling system 204.

During operation, the management access terminal 202 can communicate access information, such as one or more encryption keys, access keys, digital certificates, passwords, system passwords, or any combination thereof, sufficient to enable an initialization or reboot of the remote information handling system 204. For example, the management access terminal 202 can format and communicate the access information to the remote information handling system 204 as an in-band or out-of-band network traffic communication. For example, the management access terminal 202 can include header information, such as a machine access code (MAC) address of the out-of-band NIC 216, within the communicated data packets operable to identify the data packet upon receipt at the remote information handling system 204 as being out-of-band network traffic. As such, the out-of-band network traffic can be communicated as management network traffic 218 using header information having a destination of the out-of-band NIC 216. The out-of-band NIC 216 can receive the access information and the access information can be communicated to the controller 210. The controller 210 can store the access information within the memory 212 or another accessible memory location operable to be used in association with the initialization process 208. In this manner, the access information can be used during an initialization of the remote information handling system 204 upon a request of the management access terminal 202 obviating the need to couple an access key, USB key, or input a password or key information directly to the remote information handling system 204.

In another form, the management access terminal 202 can communicate the access information using an in-band network traffic communication of the network 206. For example, the management access terminal 202 can format the access information to include a MAC address of the NIC 214 and the access information can be communicated to the NIC 214. The NIC 214 can receive the access information and couple the access information to the initialization process 208. The initialization process 208 can in turn couple the access information to the controller 210 to store within the memory 212. However, in other forms, the access information can be stored within a memory accessible by the initialization process during an initialization sequence to validate a request to initialize the remote information handling system 204.

In another form, the management access terminal 202 can communicate the access information 218 using an in-band network traffic communication of the network 206. For example, the management access terminal 202 can format the access information to include a MAC address of the NIC 214 and the access information can be communicated to the NIC 214. The NIC 214 can receive the access information and couple the access information to the initialization process 208. The initialization process 208 can in turn couple the access information to the controller 210 to store within the memory 212. However, in other forms, the access information can be stored within a memory accessible by the initialization process during an initialization sequence to validate a request to initialize the remote information handling system 204.

Figure 3:
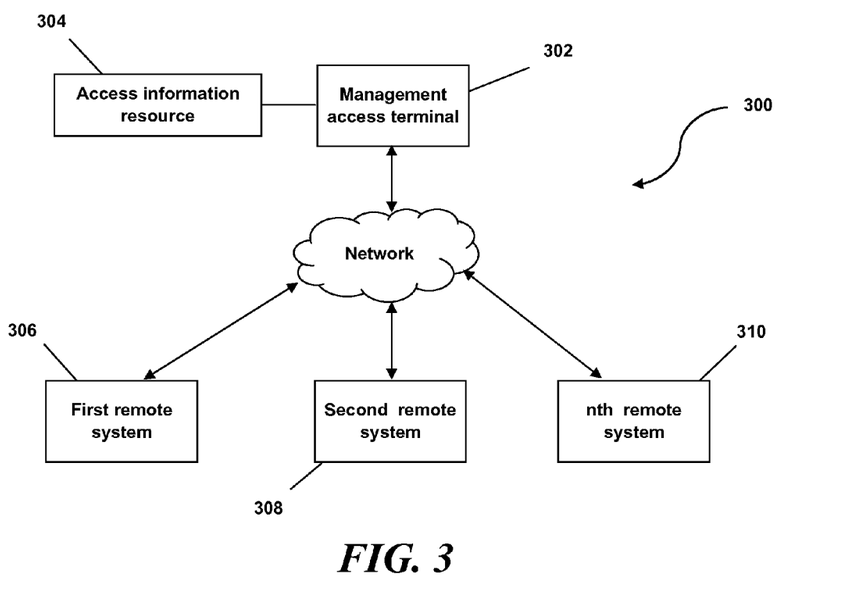
FIG. 3 illustrates a block diagram of an access system operable to enable initialization sequences within multiple remote information handling systems according to one aspect of the disclosure.

FIG. 3 illustrates a block diagram of an access system operable to enable initialization sequences within multiple remote information handling systems according to one aspect of the disclosure. The access system 300 can include a management access terminal 302 including access information resource 304 operable to store access information that can be used to enable an initialization or reboot of a remote information handling system. The management access terminal 302 can be used to initialize or reboot a first remote system 306, a second remote system 308, up to an $n^{th}$ remote system 310, or any combination thereof. In one form, the access information resource 304 can include one or more one or more encryption keys, access keys, digital certificates, passwords, system passwords, and in one form, can be configured to include a single combination of access information that can be used to enable an initialization of one, two, or multiple remote systems 306, 308, 310, or any combination thereof.

During use, the management access terminal 302 can be employed to access one or more of the remote systems 306, 308, 310. For example, the management access terminal 302 can be used to install updates, configure parameters, initialize, reboot, or various other functions, that may need desired. The management access terminal 302 can communicate the access information obtained from the access information resource 304 to one or more of the remote systems 306, 308, 310 to enable initialization or rebooting of a specific system. In this manner, a user of the management access terminal 302 need not access each remote system 306, 308, 310 directly to authorize an initialization sequence or reboot of each remote system 306, 308, 310.

According to one aspect, the access system 300 can be used to select a memory location or device to store the access information. In one form, a user of the management access terminal 302 can select a memory device, location, address, or any combination thereof, within one or more of the remote systems 306, 308, 310. For example, the first remote system 306 can be operable to store the received access information within a memory accessible by the BIOS of the first remote system 306. Additionally, the second remote system 308 can be operable to store the access information within the memory of a BMC, and the $n^{th}$ remote system 310 can be operable to employ the access information stored in association with an IMC. As such, the management access terminal 302 can be used to selectively load the access information and specify a memory location to store the access information at each remote system 306, 308, 310. In the manner, each remote system 306, 308, 310 can be configured differently as desired and can access the access information from various memory devices or locations thereby obviating the need for a user to directly access a remote system and input a password or couple a physical device that can include an access key, password, etc.

Figure 4:
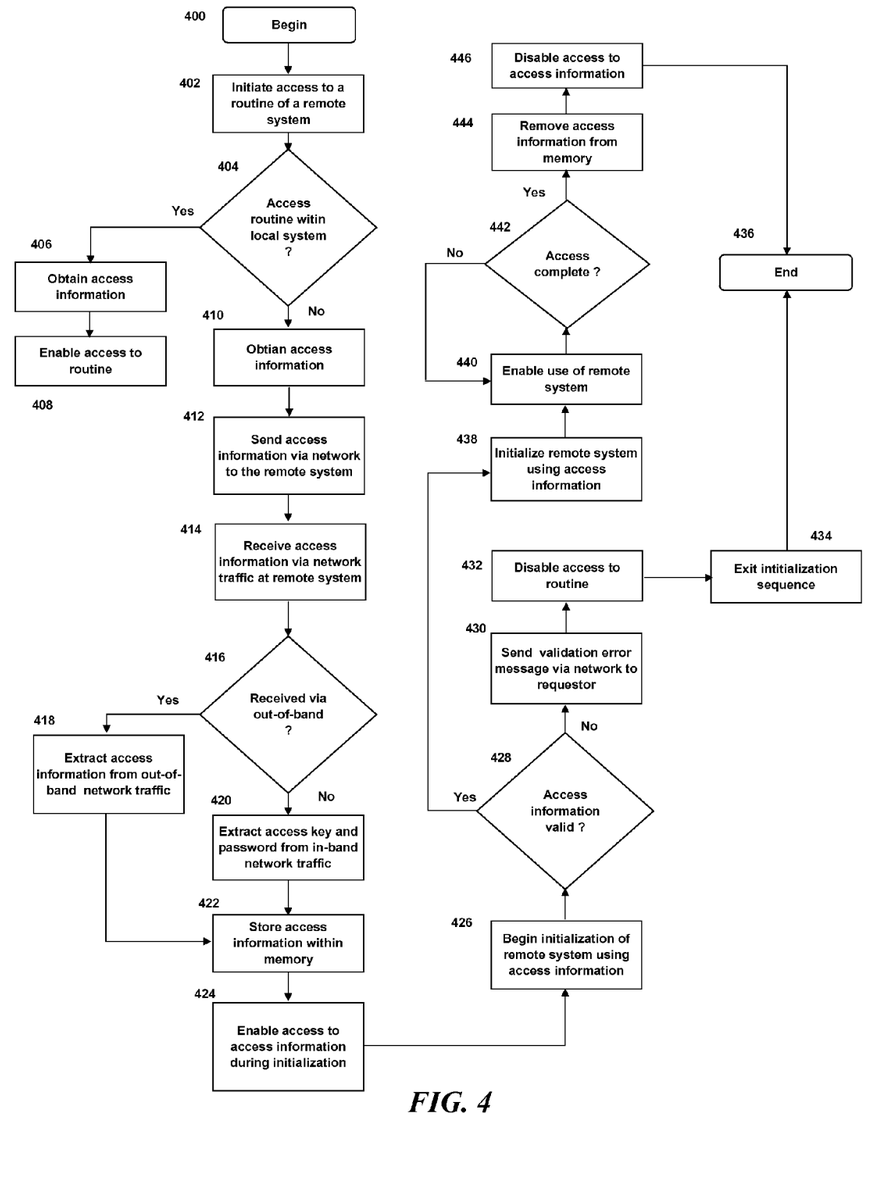
FIG. 4 illustrates a flow diagram of a method of enabling an initialization sequence of a remote information handling system according to one aspect of the disclosure.

FIG. 4 illustrates a flow diagram of a method of enabling an initialization sequence of a remote information handling system according to one aspect of the disclosure. FIG. 4 can be employed in whole, or in part, by the information handling system 100 depicted in FIG. 1, the access system 200 described in FIG. 2, the access system 300 illustrated in FIG. 3, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

The method begins generally at block 400. At block 402, access to a routine of a remote information handling system can be initiated and at decision block 404, the method can determine if access to a routine or a local system is desired. For example, a user may be directly accessing a system, as such the access information can be obtained at block 406 and local access to the system can be enabled at block 408.

If at decision block 404, access to a remote system is desired, the method can proceed to block 410 and obtains access information to be communicated to the remote system. The method can then proceed to block 412 and communicates the access information to the remote system. The method can then proceed to block 414 and the access information can be received at the remote system via network traffic. The method can then proceed to decision block 416, and if the access information is received as out-of-band network traffic, the method can proceed to block 418 and the access information can be extracted from the out-of-band network traffic. The method can then proceed to block 422 as described below. At decision block 416, if the access information is not received within the out-of-band network traffic, the method can proceed to block 420 and the access information can be extracted from the in-band network traffic. The method can then proceed to block 422 and the access information can be stored within a memory of the remote system. For example, the access information can be stored within a BIOS memory, memory provided in association with a management controller, or any other type of memory operable to be accessed and used during an initialization of the remote system. In other forms, the access information can be received in association with a specified location or entry to store the access information within a specific memory location or device of the remote system. As such, a specified location can be determined and the access information can be stored within a memory as desired.

Upon storing the access information, the method can proceed to block 424 and access to the access information can be enabled. For example, access can include notifying an initialization process that access information has been stored within a memory of the remote system. The method can proceed to block 426, and the remote system can be initialized or booted using the stored access information. For example, a user of a management access terminal can request a reboot or initialization of the remote system. The method can then proceed to decision block 428, and determines if valid access information has been stored. For example, the remote system can employ a BIOS, BMS, IMC, TPM, during an initialization sequence that can be configured to enable access using a predetermined, or preinstalled access information, that may be encoded and stored to be used in association with validating a request to initialize the remote system. As such, at decision block 428, the stored access information received via the network can be compared to the predetermined or preinstalled access information. If valid access information is not provided, the method can proceed to block 430 and an validation error message can be sent to the requestor. The method can then proceed to block 432 and access to initialize the remote system can be disabled, and the initialization sequence can be exited or terminated. The method can then proceed to block 436 and end.

If at decision block 428, the access information is validated, the method can proceed to block 438 and the remote system can be initialized or rebooted. The method can then proceed to block 440 access to the remote system can be enabled and, at decision block 442, if access is not complete, the method can proceed to block 440. If at decision block 442, access is complete, the method can proceed to block 444 and the access information stored within the memory can be removed or cleared. For example, an initialization sequence can be configured to clear a memory location or buffer that may have been used to store the access information. As such, the memory location can be cleared and the method can proceed to block 446 and access to the remote system can be disabled. The method can then proceed to block 436 and end. In this manner, access information can be communicated to one or more remote systems via an in-band or out-of-band network, and the remote system can be initialized or rebooted as desired. As such, a user or administrator need not be physically located at the remote system to enable management access to the system, reinitialize the system, reconfigure the system, create a virtual client, input a passkey or password, or any other type of information directly to the remote system. Although illustrated as a method of enabling access to initialize or reboot an information handling system from a remote location, it should be understood that other functions of an information handling system that may require use of access information can be validated or enabled using the method of FIG. 4.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of enabling an initialization of an information handling system, comprising:
   receiving a request to initialize a remote information handling system;
   determining access information operable to enable an initialization sequence of the remote information handling system, the access information configured to enable an initialization of the remote information handling system;
   communicating the access information via a network to the remote information handling system;
   receiving the access information at the remote information handling system;
   storing the access information within a memory of the remote information handling system;
   validating the access information;
   enabling the initialization sequence in response to the validation;
   initializing the remote information handling system using the stored access information;
   removing the stored access information from the memory in response to the access information being validated and in response to the remote information handling system being initialized; and
   disabling access to the remote information handling system in response to the access information being validated and in response to the remote information handling system being initialized.

2. The method of claim 1, wherein the access information includes one or more encryption keys, access keys, or any combination thereof.

3. The method of claim 1, further comprising:
   determining a location in the memory to store the access information within the remote information handling system; and
   storing the access information at the location in the memory.

4. The method of claim 1, further comprising:
   determining an access key of the remote information handling system;
   determining a system password of the remote information handling system; and
   communicating the access key and the password as the access information to the remote information handling system.

5. The method of claim 1, further comprising:
   formatting the access information as in-band network traffic; and
   communicating the access information within an in-band network traffic communication.

6. The method of claim 1, further comprising:
   formatting the access information as out-of-band network traffic; and
   communicating the access information within an out-of-band network traffic communication.

7. The method of claim 1, further comprising:
   receiving the communication at the remote information handling system;
   determining if the communication includes the access information within an in-band network traffic communication or out-of-band network traffic communication; and
   extracting the access information from the communication.

8. The method of claim 1, further comprising:
   receiving a request to store the access information in within the memory of the remote information handling system; and
   communicating a reference to the memory in association with the access information.

9. The method of claim 8, further comprising:
   receiving the access information and the reference at the remote information handling system; and
   determining the memory using the reference.

10. The method of claim 1, further comprising:
    determining access information of a plurality of remote information handling systems;
    communicating the access information to a first remote information handling system of the plurality of information handling systems, the access information including a first access information; and
    communication the first access information to a second remote information handling system of the plurality of information handling systems.

11. An information handling system comprising:
    a communication module operable to receive a communication from a management access terminal operable to communicate access information configured to enable use of an initialization sequence;
    a processor operable to employ an initialization process for validating use of the initialization sequence using the access information, to enable the initialization sequence and to remove the access information in response to the access information being validated and in response to initializing the information handling system, and to disable access to the information handling system from the management access terminal in response to the access information being validated and in response to the information handling system being initialized; and a memory operably coupled to the processor and accessible by the initialization process, the memory further operable to store the access information received by the communication module.

12. The information handling system of claim 11, further comprising:
a management controller operably coupled to the communication module and operable to initiate the initialization process; and
wherein the initialization process is operable to access an initialization sequence operable to be enabled upon validating the access information.

13. The information handling system of claim 11, further comprising the processor operable to selectively store the access information within the memory as identified by a reference input at the management terminal in association with communicating the access information.

14. The information handling system of claim 11, wherein the communication module includes an out-of-band network communication module operable to receive the access information via an out-of-band network traffic communication including the access information.

15. The information handling system of claim 11, wherein the communication module includes an in-band network communication module operable to receive an in-band network traffic communication including the access information.

16. The information handling system of claim 11, wherein the access information includes a machine access code address of a network interface card associated with the communication module.

17. A method of enabling initialization of an information handling system, comprising:
receiving a communication including an access information operable to enable an initialization sequence;
storing the access information within a memory accessible in association with using the initialization sequence;
receiving a request to initiate the initialization sequence;
determining a location storing the access information;
validating the access information;
enabling the initialization sequence in response to the validation;
initializing the information handling system using the access information;
removing the access information from the memory in response to the access information being validated and in response to initializing the information handling system; and
disabling access to the information handling system in response to the access information being validated and in response to the information handling system being initialized.

18. The method of claim 17, further comprising:
determining an access key of the information handling system using the access information;
determining a system password of the information handling system using the access information; and
validating the access key and the password in association with the initialization sequence.

19. The method of claim 17, further comprising:
receiving the access information in association with a communication of the access information to a plurality of remote information handling systems; and
enabling use of the access information to enable an initialization sequence, wherein the access information is configured to be used by the plurality of remote information handling systems to selectively enable an initialization sequence of each of the plurality of remote information handling systems.

20. The method of claim 17, wherein the access information includes a machine access code address of a network interface card.

* * * * *